Patented Aug. 4, 1936

2,049,648

UNITED STATES PATENT OFFICE 2,049,648

ANTHRAQUINONE DYESTUFFS

Norman Hulton Haddock, Frank Lodge, and Colin Henry Lumsden, Blackley, Manchester, England, assignors to Imperial Chemical Industries Limited, a corporation of Great Britain No Drawing. Application October 28, 1935, Serial No. 47,201. In Great Britain October 31, 1934

7 Claims. (Cl. 260—59)

This invention relates to acid anthraquinone dyestuffs.

These dyestuffs are, 1-amino-(-methylamino-, or -hydroxy-) 4-phenylaminoanthraquinonesulfonic acids which are distinguished by carrying a short-chain ($C_3$—$C_7$) alkyl substituent in the phenyl radical.

We find that the presence of the alkly substituent improves the dyestuffs. For instance it improves them in respect of the fastness to washing and milling of the shades which they yield when dyed on wool.

According to the invention we make the said new dyestuffs by interacting a 1-halogen-4- -amino-, methylamino- or hydroxy-anthraquinone, which may carry a methyl, halogen or sulfo substituent in the 3-position, with a C-alkyl ($C_3$—$C_7$) aniline, and then when the product is not already a sulfonic acid introducing a sulfo substituent. A sulfo substituent may be introduced by sulfonating or where there is a halogen substituent in the 3-position if desired by treating with a soluble sulfite.

The alkylaniline may also carry halogen or methyl substituents.

Interaction of the anthraquinone derivative with the analine may be effected for example by heating in a solvent with a copper catalyst and an acid absorber; the solvent may be for instance pyridine or excess of the aniline or where there is a sulfo group present it may be water. Sulfonation may be done with concentrated sulfuric acid or oleum and replacement of the halogen substituent with a sulfonic acid substituent by heating with a soluble sulfite in a mixture of for example phenol and water.

The following examples illustrate, but do not limit the invention, the parts being by weight.

Example 1.—19 parts of 1:3-dibromo-4-aminoanthraquinone, 15 parts of 4-aminobutylbenzene (Hickinbottom, J. Chem. Soc., 1930, 1565), 5 parts of potassium acetate, 0.4 part of crystalline copper acetate and 40 parts of pyridine are stirred at 115°–120° C., for 16 hours. The mixture is cooled, filtered and the solid washed successively with pyridine, alcohol and water. The product is a blue crystalline substance, soluble in benzene with a bright blue colour. It is 2-bromo-1-amino-4-p-butylanilinoanthraquinone.

10 parts of this product are dissolved in 240 parts of molten phenol, mixed in an autoclave with a solution of 100 parts of sodium sulfite crystals in 120 parts of water, and the mixture heated at 170° C. for 6 hours. It is cooled and the phenol removed by distillation in steam. The product is collected and dried. It is purified by extraction with benzene which removes some soluble material, and if necessary the product is further purified by dissolving in boiling water and filtering to remove any insoluble material, the pure dyestuff being finally salted out by adding 5% of sodium chloride. The new dyestuff 1-amino-4-butylanilinoanthraquinone-2-sulfonic acid after drying and powdering is a blue solid, readily soluble in water with a bright blue colour. It dyes wool from an acid bath in blue shades which show better washing and milling fastness compared with 1-amino-4-anilinoanthraquinone-2-sulfonic acid.

Example 2.—16 parts of 4-amino-isoamylbenzene (prepared by the method described for 4-aminobutylbenzene loc. cit., but using isoamyl instead of butyl alcohol) are used instead of the 15 parts of 4-aminobutylbenzene and the process otherwise done as in Example 1. A dyestuff is obtained which is similar to that of Example 1, but which has even better washing and milling fastness.

Example 3.—10 parts of 1: 3-dibromo-4-aminoanthraquinone, 6 parts of potassium acetate, 0.2 part of crystalline copper acetate and 30 parts of p-n-butyl-o-toluidine (prepared by following the method for 4-aminobutylbenzene loc. cit., but using o-toluidine instead of aniline) are stirred at 110° C. for 20 hours. The mixture is cooled filtered and washed with alcohol and water. The product is dried and crystallized from 3 parts of pyridine.

The product, 2-bromo-1-amino-4-p-n-butyl-o-toluidinoanthraquinone, is a blue crystalline substance soluble in benzene with bright blue colour.

7 parts of the product, 50 parts of phenol, 12 parts of sodium sulfite crystals and 25 parts of water are stirred together in an autoclave at 165° C. for 6 hours, cooled and the dyestuff precipitated by addition of caustic soda liquor, filtered off and washed with weak brine. It is dried at 50° C. and then purified by extraction with ligroin until all blue soluble material is removed.

The so-obtained new dyestuff, 1-amino-4-p-n-butyl-o-toluidinoanthraquinone-2-sulfonic acid is a bright blue powder which dissolves in hot water and dyes wool from a neutral or weakly acid bath in bright blue shades having the same washing and milling fastness as those of the dyestuff of Example 1.

*Example 4.*—10 parts of the condensation product i. e. 2-bromo-1-amino-4-p-isoamylanilinoanthraquinone of Example 2 are dissolved in 100 parts of 100% sulfuric acid, 30 parts of oleum (20% $SO_3$) are added at 20° C., and the dyestuff precipitated in 300 parts of ice water, filtered off, washed with weak brine containing a little sodium carbonate and dried at 100° C.

The new dyestuff 2-bromo-1-amino-4-p-isoamylanilinoanthraquinone sulfonic acid dissolves in concentrated sulfuric acid with a blue colour and in boiling water yields bright blue solutions which dye wool from a neutral or weakly acid bath, in blue shades of better fastness to severe washing and milling than those from the analogous p-toluidino dyestuff.

*Example 5.*—13 parts of 1:3-dibromo-4-aminoanthraquinone, 15 parts of p-heptylaniline (prepared by the method described for 4-aminobutylbenzene loc. cit., but using heptyl alcohol instead of isoamylalcohol), 20 parts of the monoethyl ether of ethylene glycol, 6.5 parts of potassium acetate and 0.1 part of crystalline copper acetate are stirred and boiled under reflux for 16 hours. The mixture is cooled, diluted with methylated spirits, filtered and washed with methylated spirits. When dry the product is a blue crystalline powder, soluble in benzene with a bright blue colour.

The so-obtained compound is treated with sodium sulfite in phenol and water as in Example 1. The resulting dyestuff 1-amino-4-p-heptyl anilinoanthraquinone-2-sulfonic acid dyes wool from a neutral or slightly acid bath in shades which are even faster to severe washing and milling than those from the dyestuff of Example 1.

*Example 6.*—10 parts of 1-chloro-4-hydroxyanthraquinone, 30 parts of p-isoamylaniline, 25 parts of the monoethyl ether of ethylene glycol, 6 parts of potassium acetate and 0.2 part of crystalline copper acetate are stirred at 140° C. for 4 hours. After cooling to 80° C., 150 parts of alcohol are added and the product filtered cold. It is washed with alcohol and water and dried at 50° C.

The new product, 1-p-isoamylanilino-4-hydroxyanthraquinone is a violet crystalline substance melting at 95° C. It dissolves in concentrated sulfuric acid with a green colour.

For sulfonation, 10 parts of the product are dissolved in 100 parts of 100% sulfuric acid at 20° C., 9 parts of "oleum" (20% $SO_3$) added, the mixture stirred for 15 minutes and poured into 300 parts of ice water and filtered. The filter-cake is stirred into 750 parts of water at 80° C., neutralized with caustic soda and the dyestuff precipitated with salt, is filtered cold, washed with 5% brine and dried at 80° C.

The new dyestuff 1-p-isoamylanilino-4-hydroxyanthraquinonesulfonic acid is a violet powder which dissolves in water with a violet colour and dyes wool from a neutral or dilute acid bath in violet shades which have better fastness to severe washing and milling than those from the analogous p-toluidino dyestuff.

When 1-bromo-4-methylaminoanthraquinone is used instead of 1-chloro-4-hydroxyanthraquinone and the product sulfonated with oleum, a dyestuff is obtained which dyes wool from a neutral bath in greenish-blue shades having superior washing and milling fastness to the analogous p-toluidino dyestuff.

*Example 7.*—1 part of the dyestuff from Example 1 is dissolved in 3000 parts of water containing 1.5 parts of sodium cetyl sulfate 15% paste. 50 parts of well-wetted woolen yarn are entered, the dye-bath raised to the boil in ½ hour and maintained at the boil for 1 hour. The dyed yarn is removed, rinsed in cold water and dried. The wool is dyed in blue shades which are brighter than when no sodium cetyl sulfate is used.

We claim:

1. Anthraquinone dyestuffs of the following formula

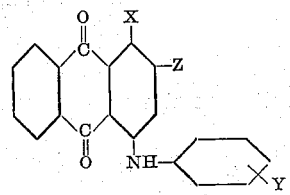

where X is a substituent from the group consisting of hydroxyl, amino, and methylamino, Y is an alkyl substituent containing not less than 3 nor more than 7 carbon atoms, and Z is a substituent chosen from the group consisting of hydrogen, halogen, methyl, and sulfo, and where the phenyl nucleus carrying the Y substituent may carry at least one sulfo substituent, and must carry at least one if Z is not sulfo.

2. Process for the manufacture of anthraquinone dyestuffs, which comprises interacting a compound of the following formula

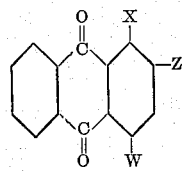

where X is a substituent chosen from the group consisting of hydroxyl, amino and methylamino, Z is a substituent chosen from the group hydrogen, halogen, methyl and sulfo, and W is halogen, with an alkylaniline in which the alkyl contains not less than 3 nor more than 7 carbon atoms, and then when the product is not already a sulfonic acid introducing a sulfo substituent.

3. Process as claimed in claim 2, in which the sulfo substituent is introduced by sulfonating.

4. Process as claimed in claim 2 in which the sulfo substituent is introduced by treating a product in which Z is halogen with a soluble sulfite.

5. An anthraquinone dyestuff of the following formula:

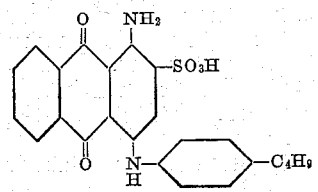

6. An anthraquinone dyestuff of the following formula:
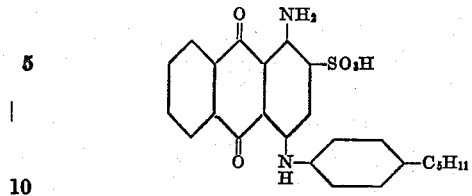
7. An anthraquinone dyestuff of the following formula:
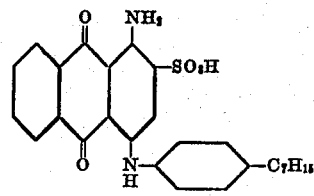
NORMAN HULTON HADDOCK.
FRANK LODGE.
COLIN HENRY LUMSDEN.